(12) United States Patent
Menard et al.

(10) Patent No.: US 6,290,046 B2
(45) Date of Patent: Sep. 18, 2001

(54) FRICTION LINER HAVING A NETWORK OF GROOVES, FOR A CLUTCH

(75) Inventors: Denis Menard; Philippe Luquet, both of Limoges (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/785,644

(22) Filed: Feb. 16, 2001

Related U.S. Application Data

(62) Division of application No. 09/415,982, filed on Oct. 12, 1999, now Pat. No. 6,213,273.

(51) Int. Cl.⁷ ............................. F16D 69/00; F16D 13/64; F16H 45/02
(52) U.S. Cl. ..................... 192/107 M; 192/3.29; 192/107 R; 192/113.36
(58) Field of Search .................. 192/3.28, 3.29, 192/3.3, 70.12, 70.14, 107 R, 107 M, 113.36

(56) References Cited

U.S. PATENT DOCUMENTS

| | | |
|---|---|---|
| 4,878,282 | 11/1989 | Bauer . |
| 5,101,953 * | 4/1992 | Payvar ............................. 192/107 R |
| 5,501,309 * | 3/1996 | Walth et al. ........................ 192/3.29 |
| 6,145,645 * | 11/2000 | Kroll et al. ...................... 192/113.36 |

FOREIGN PATENT DOCUMENTS

| | | |
|---|---|---|
| 43 22 231 | 1/1995 | (DE) . |
| 0 305 582 | 3/1989 | (EP) . |
| 0 550 961 | 11/1992 | (EP) . |
| 669982 | 4/1952 | (GB) . |

OTHER PUBLICATIONS

Patent Abstracts of Japan vol. 010, No. 171 (M–489); Jun. 17, 1986 & JP 61 021425 A (Toyota Jidosha KK), Jan. 30, 1986.
French Search Report dated Feb. 28, 1997.

\* cited by examiner

*Primary Examiner*—Richard M. Lorence
(74) *Attorney, Agent, or Firm*—Morgan & Finnegan LLP

(57) ABSTRACT

A torque converter includes a bridging clutch having an annular friction liner for engaging axially against a reaction surface of the clutch. The liner is in the form of an annular ring having a friction surface, an outer perimeter and an inner perimeter, with a network of grooves formed in the friction surface to enable a liquid to flow between the liner and the reaction surface. The network of grooves is not open radially in the outer perimeter of the liner.

6 Claims, 4 Drawing Sheets

US 6,290,046 B2

FRICTION LINER HAVING A NETWORK OF GROOVES, FOR A CLUTCH

This is a divisional of application Ser. No. 09/415,982, filed Oct. 12, 1999 now U.S. Pat. No. 6,213,273.

FIELD OF THE INVENTION

This invention relates to friction liners, in particular for bridging clutches for torque converters.

More particularly, the invention relates to a friction liner of the above type which has an annular friction surface for making axial contact against a reaction surface, the liner being also of the type in which the friction surface is formed with a network of grooves to enable a liquid to flow between the liner and the reaction surface.

BACKGROUND OF THE INVENTION

Torque converters are in particular used in motor vehicles to provide a coupling between the heat engine of the vehicle and the gearbox, which may be automatic and/or of a continuously variable type. In a torque converter, the transmission of the torque is obtained by circulation of a fluid between two bladed or finned wheels or rotors, one of which is coupled to the engine and the other to the gearbox. In their construction, these two wheels are not coupled together mechanically, so that there always exists between them the possibility of relative slipping movement. In some operating modes of the vehicle, this slipping movement is of no value and can even be detrimental to the overall performance of the drive train of the vehicle.

In addition, in parallel with the torque converter, a bridging clutch is generally provided, for the purpose of making a direct mechanical coupling between the engine and the gearbox in certain operating modes, corresponding for example to quasi stabilised speed ranges. Up to the present time, such bridging clutches have been used essentially in an "all or nothing" operating mode, that is to say they are used only in a fully engaged state or a fully disengaged state.

With a view to optimizing the performance of the drive train of the vehicle considered as a whole, it is now thought desirable to use the bridging clutch in a larger number of operating modes of the drive train, and especially, for example, during gear changing operations. In addition, the bridging clutch is tending more and more to be used, no longer only in its fully engaged and fully disengaged states, but also in a mode in which it slips, in particular with a view to damping out torque variations.

Thus, there is now an increasing tendency for the bridging clutch to be operated in a way which tends to give rise to severe heating, firstly of the contact surfaces and secondly of the oil which not only controls the clutch but also cools it.

With a view to preventing this additional heating causing accelerated wear of the liners, or causing the oil to be degraded by carbonization, it has previously been proposed to arrange on the friction liners a network of grooves which give improved circulation of the oil between the friction liner and the reaction surface. Various proposals have been made as to the form of the grooves in this type of network, all of them aiming to establish communication between the outer and inner perimeters of the annular friction liner.

However, the existence of the network of grooves gives rise to a loss of oil, even when the bridging clutch is used in its fully engaged mode and when there are no longer any differences in speed between the input shaft connected to the engine and the output shaft connected to the gearbox. In addition, the presence of these grooves in the friction liner substantially reduces the effective contact surface between the friction liner and the reaction surface, to the detriment of the torque that can be transmitted without slipping by the bridging clutch.

DISCUSSION OF THE INVENTION

The object of the invention is to overcome the above mentioned problems.

According to a first embodiment of the invention, a friction liner for a bridging clutch of a torque converter, having an annular friction surface which is adapted to make axial engagement against a reaction surface, the friction liner being of the type in which the friction surface includes a network of grooves to enable a liquid to flow between the liner and the reaction surface, is characterized in that the network of grooves comprise concentric circular grooves which are connected together through radial grooves spaced apart circumferentially, in that radial grooves are open firstly into an inner circular groove and secondly at the inner edge of the liner, in that the radial grooves formed between two circular grooves are offset circumferentially with respect to the radial grooves formed between the inner circular groove and the inner edge, and in that the radial grooves are not open radially to the outside of the liner.

According to a second embodiment the invention, a friction liner for a bridging clutch of a torque converter, having an annular friction surface which is adapted to make axial engagement against a reaction surface, the friction liner being of the type in which the friction surface includes a network of grooves to enable a liquid to flow between the liner and the reaction surface, is characterized in that the network of grooves is not open radially to the outside of the liner, and in that the liner has a spiral groove and a set of radial grooves which are open at the inner edge of the liner, the said radial grooves intersecting the spiral groove at several points.

According to a third embodiment of the invention, a friction liner, having an annular friction surface which is adapted to make axial engagement against a reaction surface, the friction liner being of the type in which the friction surface includes a network of grooves to enable a liquid to flow between the liner and the reaction surface, is characterized in that the network of grooves is not open radially to the outside of the liner, in that it has a single groove which is elliptical and centred on the axis of the liner, the major axis of the ellipse defined by the said single groove being shorter than the outer diameter of the liner, and in that radial grooves put the elliptical groove in communication with the inner edge of the liner.

The friction liner is preferably incorporated in a bridging clutch of a torque converter.

The depth of the grooves of the friction liner is preferably substantially equal to one half of the axial thickness of the liner.

The liner is preferably made of a composite material including carbon.

Further features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
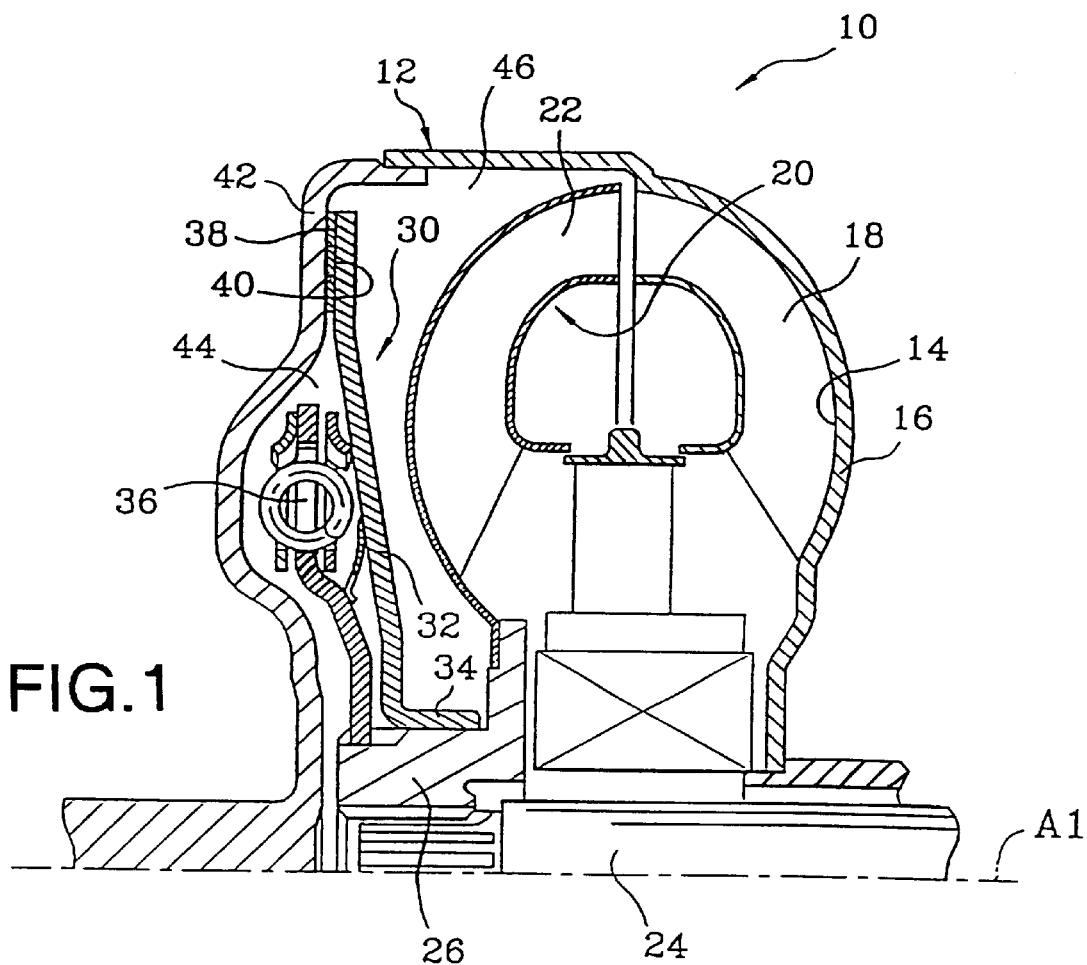
FIG. 1 is a diagrammatic view showing in axial cross section a bridging clutch for a torque converter.

FIG. 1 shows a torque converter 10 which is arranged to be, for example, interposed between a heat engine and an automatic gearbox, in a motor vehicle.

In the known way, the torque converter 10 comprises a substantially cylindrical outer casing 12 having an axis A1, which is coupled to the output shaft (not shown) of the engine of the vehicle, so as to be driven in rotation about its axis A1. The torque converter 10 has a substantially transverse wall 16 arranged on the side of the torque converter opposite to the engine. This wall 16 has an internal face 14 which carries a series of vanes 18 that act as a fluid pump. Inside the casing 12, a turbine wheel 20 is provided with vanes 22 and is mounted for rotation about the axis A1 with respect to the casing 12. The turbine wheel 20 is arranged to drive in rotation an output shaft 24 of the torque converter 10, which is coupled to the gearbox. The turbine wheel 20 is mounted on a central sleeve 26, which is coupled to the output shaft 24, for example through a splined coupling.

The casing of the torque converter contains oil which provides fluid coupling between the pump vanes 18 and the turbine wheel 20.

Again in the known way, a bridging clutch 30 is arranged within the casing 12 of the torque converter 10, for coupling the output shaft 24 of the torque converter 10 in rotation to the casing 12 when the clutch is engaged. Engagement of the bridging clutch 30 thus normally prevents relative rotational slipping movement about the axis A1 between the casing 12 (constituting a pump) and the turbine wheel 20 that drives the shaft 24.

The bridging clutch 30 includes a substantially annular movable clutch plate 32 which is mounted, through a radially-inner axial peripheral flange 34, in sliding axial movement on the central sleeve 26. The movable clutch plate 32 is also coupled in rotation to the central sleeve 26 through an interposed torsion damping device 36, for absorbing the torque variations that occur during engagement and disengagement of the clutch.

The movable clutch plate 32 carries an annular friction liner 38 at its outer periphery. The liner 38 is arranged to make axial contact against a corresponding reaction surface 40 formed on the internal face of a transverse wall 42 of the casing 12. This wall 42 is the casing wall which lies axially on the same side of the torque converter as the engine of the vehicle, and may be referred to as the proximal wall of the casing, the wall 16 then being the distal wall.

The clutch liner 38 may for example be made of a composite material comprising a resin in which reinforcing elements are embedded. These reinforcing elements may for example be in the form of cellulose fibers or carbon fibers. In another version, the liner 38 may be of a carbon/carbon composite material.

Thus, the movable clutch plate 32 defines within the torque converter casing 12 two chambers 44 and 46, between which the plate 32 constitutes a piston, in such a way that, according to the prevailing oil pressure in each of these chambers, the clutch plate 32 is urged axially in one or other direction. Thus, when the first chamber 44, which is defined between the movable clutch plate 32 and the proximal wall 42 which carries the reaction surface 40, is supplied with fluid under pressure, the movable clutch plate 32 is pushed axially in a direction such as to cause the bridging clutch 30 to be disengaged. Conversely, when the second chamber 46 of the casing 12, defined between the clutch plate 32 and the distal wall 16 and, as shown in FIG. 1, also containing the torque converter itself, is supplied with fluid under pressure, the clutch plate 32 is displaced axially in a direction such as to cause the clutch 30 to be engaged.

Reference is now made to FIGS. 4 to 9, showing three different versions of a friction liner 38 incorporating features of the invention. These liners 38 are in the form of flat annular plate elements having an axis A1 and a transverse fastening face 48, by means of which they are fastened, for example, on the movable clutch plate 32, together with an opposed annular transverse face, or friction surface, 50 which makes the frictional contact against the reaction surface 40, FIGS. 1 to 3, of the casing 12. As can be seen in FIGS. 4 to 9, the friction surface 50 is formed with a network of grooves which enable oil to circulate between the friction liner 38 and the reaction surface 40, especially for cooling purposes.

This network of grooves is not open radially towards the outside of the liner 38. Thus, the liner 38 comprises a peripheral outer ring portion 52 which is solid and which has a transverse surface, constituting part of the friction surface 50, which is continuous over the whole periphery of the liner. Instead, the grooves which constitute the above mentioned network of grooves are open radially in only the inner peripheral edge 62 of the annular friction liner 38. These grooves can be made, in particular, either by molding or by machining.

Figure 2:
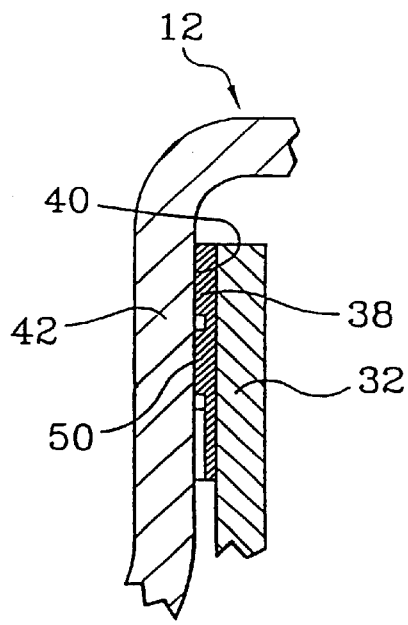
FIGS. 2 and 3 are enlarged cut-away views showing part of the clutch of FIG. 1, and illustrating more particularly the contact between the friction liner and the reaction surface of the clutch.
Figure 3:
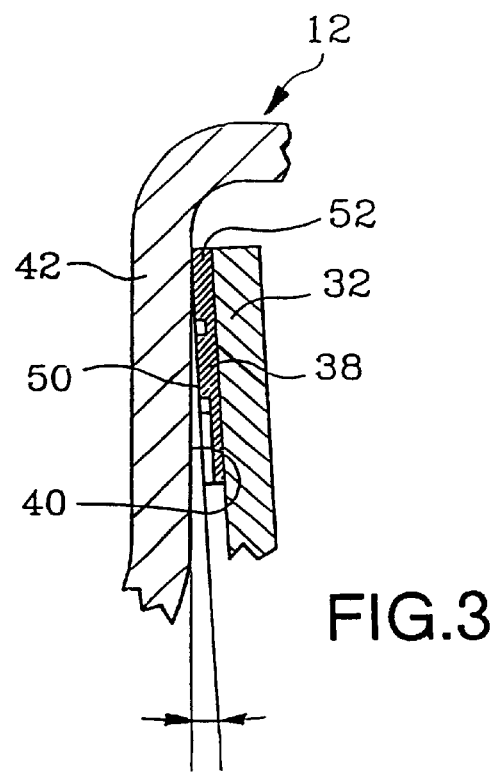

With reference to FIGS. 2 and 3, these Figures show diagrammatically the contact between the friction liner 38 against the reaction surface 40. In this connection, due to the mode of actuating of the bridging clutch 30, which is urged towards its engaged position by an excess of pressure in the chamber 46 as compared with that in the chamber 44, the movable clutch plate 32 tends to deform, due mainly to the contact force applied between the central sleeve 26 (FIG. 1) and the movable clutch plate 32 in the region of its internal flange 34.

This being so, and as is shown most particularly in FIG. 3, the movable clutch plate 32 tends to deform in such a way that the liner 38 makes its initial contact with the reaction surface 40 through the outer peripheral edge 51 (FIG. 4) of the outer ring portion 52 of the liner. Subsequently, under the effect of pressure, the contact between the liner 38 and the reaction surface 40 spreads over the whole of the frictional contact surface 50 of the liner, as can be seen in FIG. 2.

However, the use of a liner having a network of grooves which are not open radially outwardly enables the outer peripheral ring portion 52 of the liner 38 to form a seal once the ring portion 52 has made initial contact with the reaction surface 40. This seal tends to prevent any loss of oil between the friction surface 50 of the liner 38 and the reaction surface 40, and this improves transmission of the torque.

However, if the bridging clutch 30 is controlled in such a way as to slip on the reaction surface 40, that is to say if the excess pressure in the chamber 46 of the casing 12 is moderated, the contact pressure between the reaction surface 40 and the liner friction surface 50 is reduced in such a way that a slight flow of oil will be able to pass between the two surfaces 40 and 50, such as to cool them. This oil flow is assisted by the presence of the grooves which are formed in the radially inner portion of the liner 38, and which limit the radial distance over which the ring portion 52 tends to provide sealing.

As to the form of the network of grooves in the liner 38, reference is made once again to FIGS. 4 to 9 which show three different versions of this network.

Figure 4:
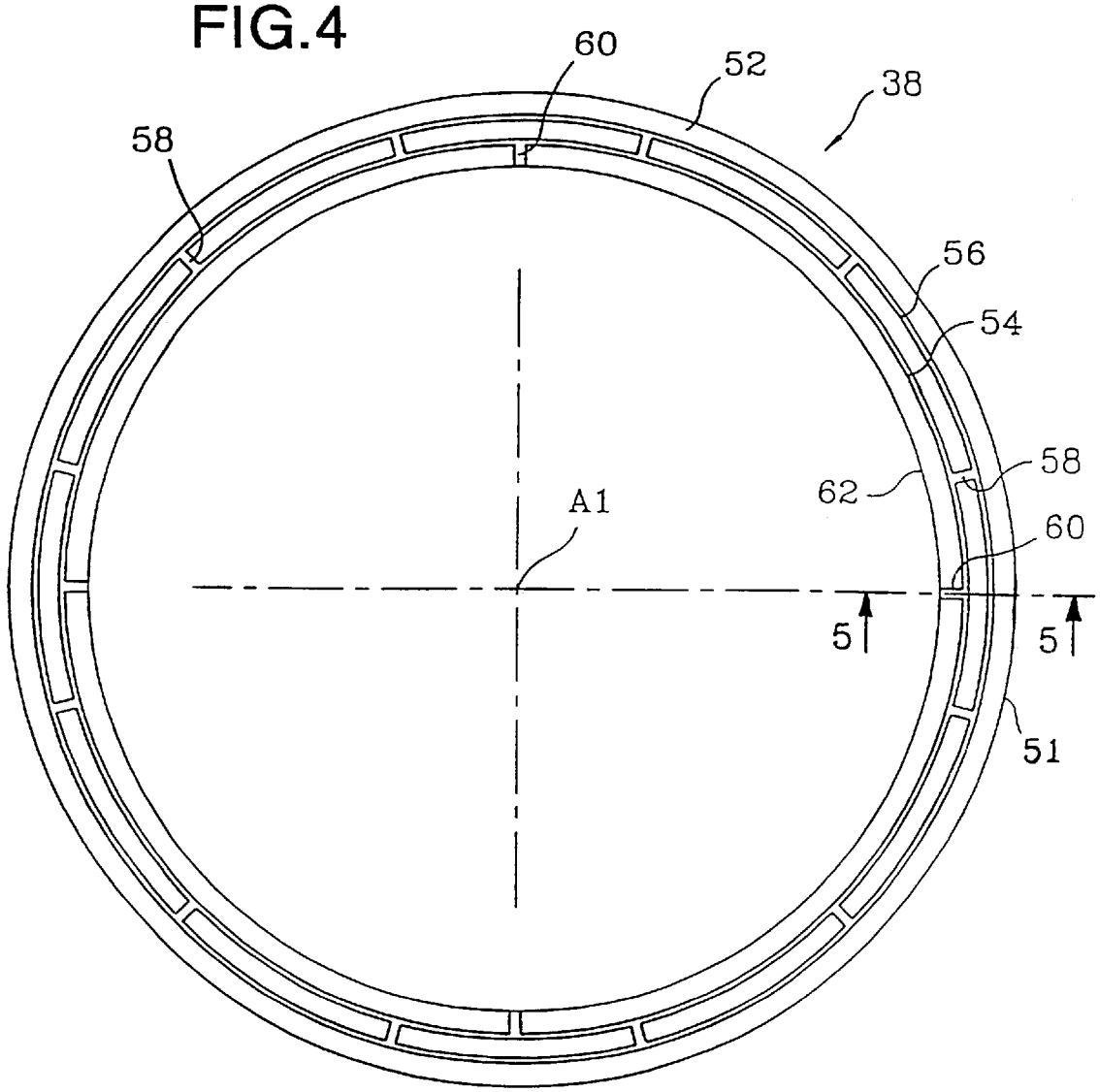
FIG. 4 is a front view of a first embodiment of an annular friction liner in accordance with the invention, for a clutch of the kind exemplified in FIGS. 1 to 3.
Figure 5:
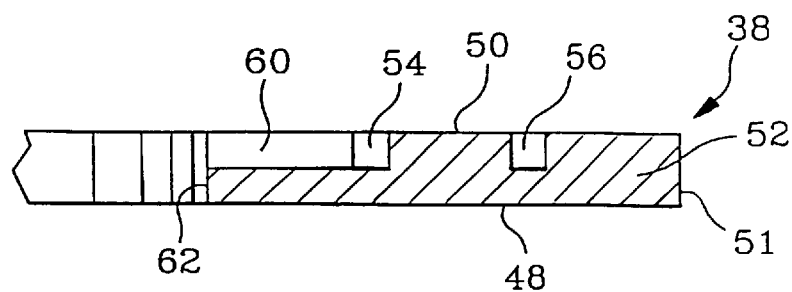
FIG. 5 is a view in cross section taken on the line 5—5 in FIG. 4.

In the first version shown in FIGS. 4 and 5, the liner has essentially two concentric circular grooves 54 and 56, which are joined together through radial grooves 58 regularly spaced apart circumferentially. In addition, further radial grooves 60, again spaced apart at regular intervals, are open firstly into the inner circular groove 54 and secondly in the inner edge 62 of the liner 38. In this embodiment, the radial grooves 58 formed between the two circular grooves 54 and 56 are offset circumferentially with respect to the other radial grooves 60 which extend between the inner circular groove 54 and the inner edge 62.

Figure 6:
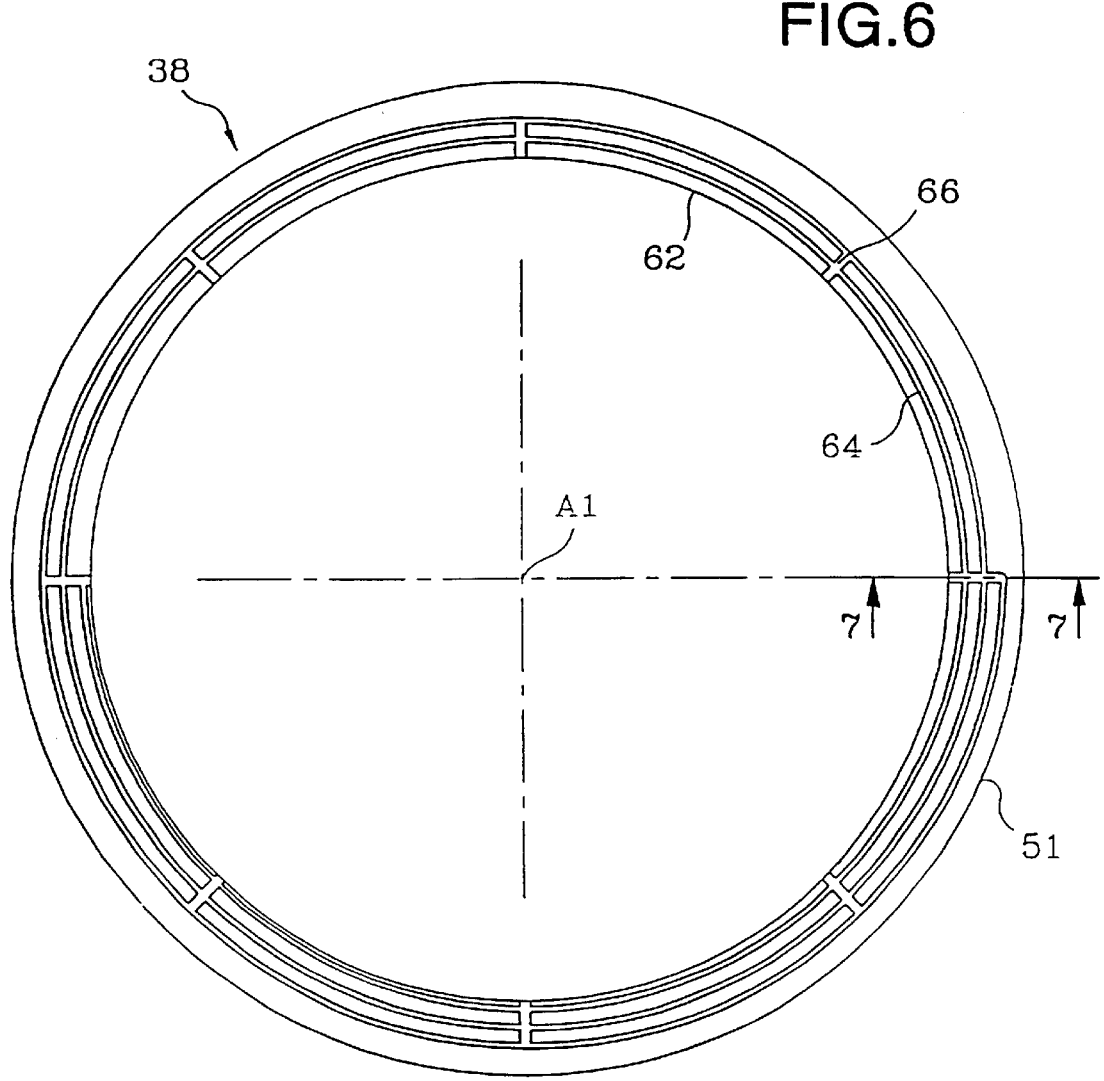
FIG. 6 is a view similar to FIG. 4 but showing a second embodiment of the invention.
Figure 7:
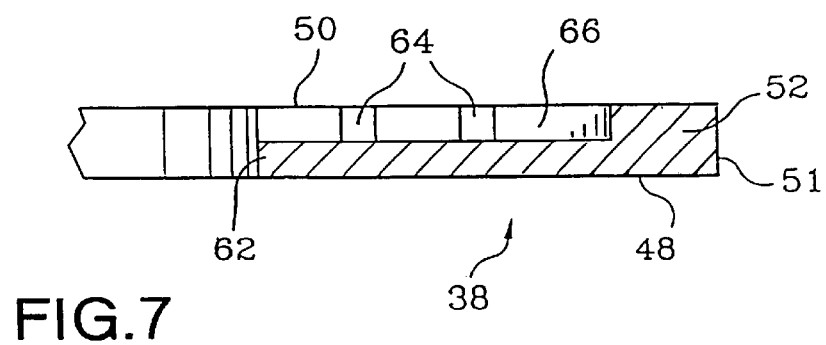
FIG. 7 is a view in cross section taken on the line 7—7 in FIG. 6.

In the second embodiment which is shown in FIGS. 6 and 7, the liner 38 has a single spiral groove 64 and a set of radial grooves 66 which are open in the inner edge 62 of the liner 38. The radial grooves 66 intersect the spiral groove 64 at several points as shown.

Figure 8:
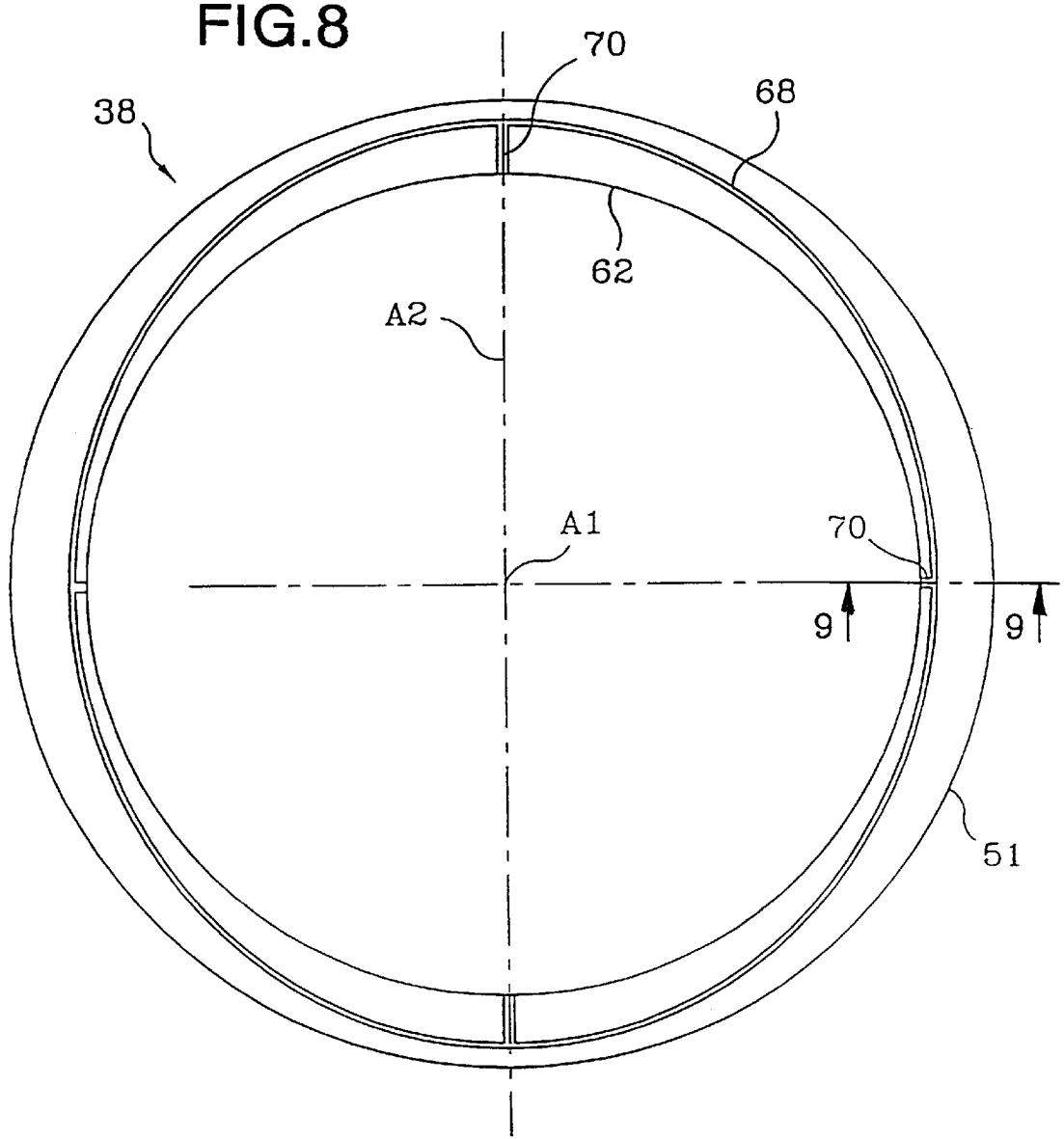
FIG. 8 is a view similar to FIG. 6 but shows a third embodiment of the invention.
Figure 9:
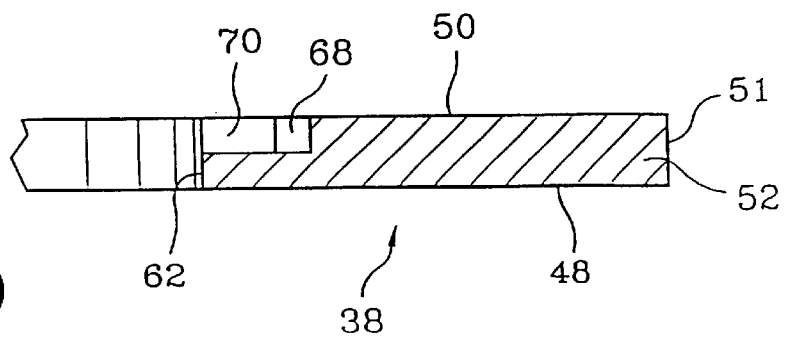
FIG. 9 is a view in cross section taken on the line 9—9 in FIG. 8.

In the third embodiment shown in FIGS. 8 and 9, the liner 38 has a single groove 68 which is elliptical, centered on the axis A1 of the liner 38. The major axis A2 of the ellipse is shorter than the outer diameter of the liner. Radial grooves 70 provide communication between the elliptical groove 68 and the internal edge 62 of the liner 38.

As can be seen most particularly in FIGS. 7 and 9, the depth of the various grooves 54, 56, 58, 60, 64, 66, 68, 70 is substantially equal to one half of the axial thickness of the liner 38.

These various embodiments of the invention show that the grooves may take a number of very different forms, so that the invention is not limited to those described above by way of example. Thus for example, it is possible to form radial grooves which are substantially developments of a circle.

In general terms, the various geometries proposed for the network of grooves in the friction liner 38 enable the torque that can be transmitted by the bridging clutch 30 to be increased, while at the same time limiting heating of the liner 38 and heating of the oil when the clutch 30 is in a slipping mode.

In addition, the invention is not limited to the use of a single friction liner. The liner 38 can, in this connection, cooperate with a further liner carried by the reaction surface.

What is claimed is:

1. A friction liner for a coupling device having a reaction surface, the liner being annular and comprising:
    a radially outer edge,
    a radially inner edge, and
    an annular friction surface adapted for cooperating engagement with said reaction surface, the liner defining a network of grooves in said friction surface for circulation of a liquid between the liner and said reaction surface, wherein communication between the network of grooves and the outer edge of the liner is absent, the network of grooves comprising:
      a single elliptical groove concentric with the liner and having a major axis shorter than the diameter of the outer edge of the liner, and
      a plurality of radial grooves joining the elliptical groove with the inner edge of the liner.

2. A friction liner according to claim 1, wherein said grooves have a depth substantially equal to one half of the axial thickness of the liner.

3. A friction liner according to claim 1, made of a composite material including carbon.

4. A bridging clutch for a torque converter having a casing, the bridging clutch comprising:
    a movable annular clutch plate for engagement with a reaction surface of the casing; and
    a friction liner according to claim 1 affixed to the clutch plate.

5. A friction liner according to claim 1, wherein the grooves have a U-shaped cross section.

6. A friction liner according to claim 1, made of a composite material comprising a resin in which reinforcing elements are embedded.

* * * * *